US005193041A

United States Patent [19]

Chanois

[11] Patent Number: 5,193,041

[45] Date of Patent: Mar. 9, 1993

[54] ELECTRICAL CURRENT INTERRUPTER

[75] Inventor: Louis M. J. Chanois, Creches S/Saone, France

[73] Assignee: Stop Circuit, Macon, France

[21] Appl. No.: 894,844

[22] Filed: Jun. 4, 1992

[30] Foreign Application Priority Data

Jun. 7, 1991 [FR] France ........ 91 07194

[51] Int. Cl.[5] ........ H02H 7/00

[52] U.S. Cl. ........ 361/13

[58] Field of Search ........ 307/568; 318/252; 361/2, 3, 5, 8–11, 13

[56] References Cited

U.S. PATENT DOCUMENTS

| | | | |
|---|---|---|---|
| 2,071,447 | 2/1937 | Young | 361/9 |
| 2,443,230 | 6/1948 | DeCoursey | 200/146 |
| 4,093,896 | 6/1978 | McAuliffe | 318/45 |
| 4,583,146 | 4/1986 | Howell | 361/13 |
| 4,885,654 | 12/1989 | Budyko et al. | 361/13 |

FOREIGN PATENT DOCUMENTS

| | | |
|---|---|---|
| 2409593 | 6/1979 | France . |
| 2581790 | 11/1986 | France . |
| 1214682 | 12/1970 | United Kingdom . |

*Primary Examiner*—Donald A. Griffin

*Attorney, Agent, or Firm*—Herbert Dubno; Andrew Wilford

[57] ABSTRACT

An electrical circuit interrupter for connection between two conductors has a first fixed contact electrically directly connected to one of the conductors, a second fixed contact adjacent the first fixed contact, a movable contact electrically directly connected to the other of the conductors, and a positive-temperature-coefficient resistor connected between the first and second fixed contacts. The movable contact is displaceable between a first closed position engaging only the first fixed contact, a second position engaging only the second contact, and an open position engaging neither of the fixed contacts, so that in the first position current can flow between the conductors without passing through the resistor, in the second position current flows through the resistor and current flow is limited thereby, and in the open position current cannot flow between the conductors.

11 Claims, 4 Drawing Sheets

ELECTRICAL CURRENT INTERRUPTER

FIELD OF THE INVENTION

The present invention relates to a current interrupter. More particularly this invention concerns a device for opening and closing a circuit in which a high current is flowing.

BACKGROUND OF THE INVENTION

In order to interrupt an electrical line in which a substantial current is flowing it is necessary to provide more than a simple switch to avoid arcing both while interrupting the current flow or while restoring it. Accordingly commonly owned French patent No. 2,581,790 describes such a device having a fixed contact, a movable contact, means for displacing the movable contact relative to the fixed one, and spring means urging the contacts out of contact with each other. In addition an auxiliary resistor is provided between the contacts and is set up so that its resistance increases as the movable contact is moved in the opening direction and vice versa. Thus by the time the circuit is actually opened, the inserted resistance is so large that current flow has been limited so much that arcing is impossible. Similarly as the device closes the circuit the resistance decreases until the movable contact engages the fixed contact and in effect the device has zero ohmage.

This auxiliary resistor is connected to the fixed contact and is provided along the path of the movable contact or of another contact coupled thereto for joint movement therewith and this contact slides on the auxiliary resistor. Thus the auxiliary resistor is an arcuate resistive path of graphite or ceramic charged with a doped polymer. In the closed position the wiper contact is off the resistive path and in effect sits on the fixed contact or on an element directly connected thereto.

In this arrangement the resistance is varied purely mechanically, that is the resistance inserted into the circuit being made or broken has an ohmage which is directly related only to the physical angular position of the movable contact. No factors other than position have any significant effect on the response of the device, least of all voltage or current.

It has also been suggested in U.S. Pat. Nos. 3,529,210 and 4,583,146 to employ in such devices so-called positive-temperature-coefficient (PTC) resistors whose resistance increases with their temperature which in turn is a function of the current passing through them, opposite to a thermistor. In such devices the PTC resistor is maintained in the circuit at all times so that it is subjected to considerable stress and has, therefore, a short service life.

OBJECTS OF THE INVENTION

It is therefore an object of the present invention to provide an improved electrical current interrupter.

Another object is the provision of such an improved electrical current interrupter which overcomes the above-given disadvantages, that is which can open and close a high-current circuit without arcing but whose more delicate circuit elements are essentially dormant and not traversed by current when the device is closed.

SUMMARY OF THE INVENTION

An electrical circuit interrupter for connection between two conductors has according to the invention a first fixed contact electrically directly connected to one of the conductors, a second fixed contact adjacent the first fixed contact, a movable contact electrically directly connected to the other of the conductors, and a solid-state positive-temperature-coefficient resistor connected between the first and second fixed contacts. The movable contact is displaceable between a first closed position engaging only the first fixed contact, a second position engaging only the second contact, and an open position engaging neither of the fixed contacts, so that in the first position current can flow between the conductors without passing through the resistor, in the second position current flows through the resistor and current flow is limited thereby, and in the open position current cannot flow between the conductors.

Thus the basic idea of the invention is to use in a circuit interrupter—a switch, circuit breaker, or the like—a PTC resistor whose resistance increases as current flow through it increases and vice versa. Thus if a current in excess of the so-called trigger level of the PTC device passes through it, it immediately heats up and clamps, increasing its ohmage and thereby reducing the current flow. This is a wholly solid-state reaction so that no arcing at switch contacts is possible. Nonetheless, during normal operation when the conductors are connected directly together the PTC resistor is wholly out of the circuit and, therefore, can be counted on to have a long service life.

In accordance with a feature of this invention a third fixed contact is provided adjacent the second fixed contact along with a second PTC resistor separate from the first-mentioned resistor and connected between the second and third contacts. In this case the movable contact is movable into a third position engaging only the third fixed contact, whereby in the third position current flows through both resistors and current flow is limited thereby. Normally the second PTC resistor has a higher resistance than the first PCT resistor.

It is also within the scope of the invention to provide a third fixed contact adjacent the second fixed contact and a flat-coefficient resistor connected between the second and third contacts. The movable contact here is movable into a third position engaging only the third fixed contact, whereby in the third position current flows through both resistors and current flow is limited thereby. This third contact lies between the first and second contacts so that on opening the contact moves into the third position before moving into the second position. The flat-coefficient resistor, which can be of standard carbon or wound construction, is mainly effective on closing or restoring flow to limit current flow through the PCT resistor until same has had a chance to heat up and clamp.

According to another feature of the invention a varistor, that is a semiconductor device whose resistance varies as the voltage applied across it varies, is provided in parallel with the PCT resistor. In addition this PCT resistor can be formed by two PTC resistors connected in circuit, that is in parallel or series.

The movable contact according to the invention is also displaceable through an intermediate position simultaneously engaging both fixed contacts. A controller is provided that has a sensor for detecting current flow through the interrupter for moving the movable contact into the open position when current flow through the interrupter exceeds a predetermined threshold.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 3:
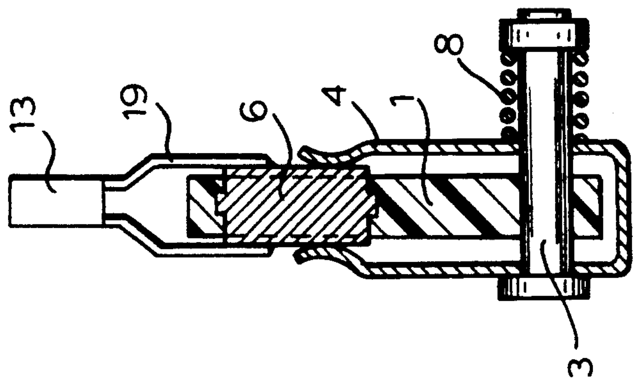
FIG. 3 is a section taken along line III—III of FIG. 2.
Figure 2:
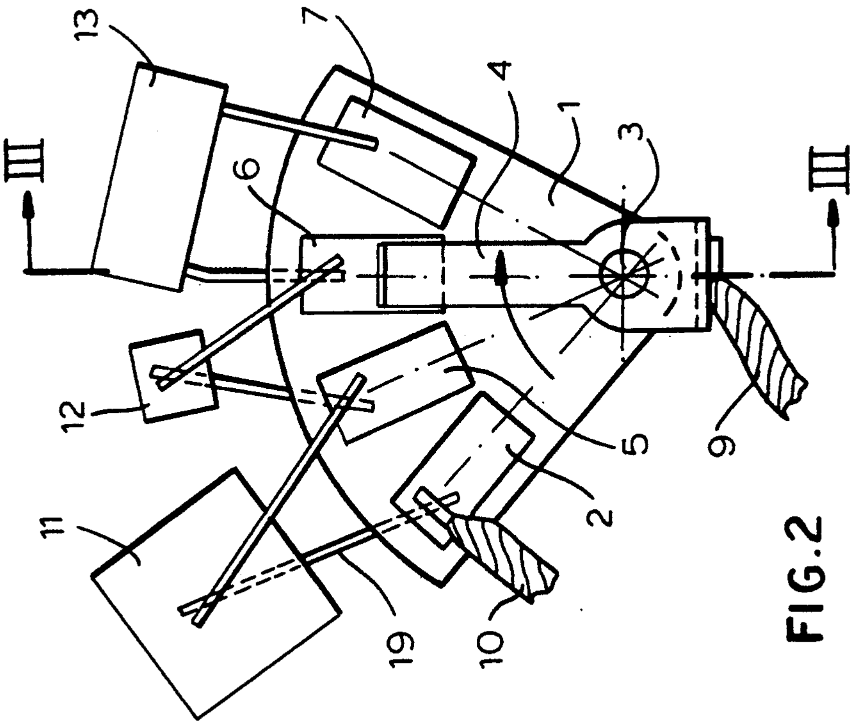
FIG. 2 is a view like FIG. 1 but in a partly open position.

As seen in FIGS. 1 through 6 an electrical current interrupter according to the invention has a relatively stationary dielectric support plate 1 on which is mounted a fixed contact 2 and in which is journaled a pivot shaft 3 carrying a movable contact 4 that can sweep in an arc centered on the shaft 3 over the fixed contact 2 and second, third, and fourth fixed contacts 5, 6, and 7 angularly spaced from it. The contacts 2, 5, 6, and 7 in fact extend through and are exposed on both faces of the plate 1 and the wiper contact 4 is formed as shown in FIG. 3 like a yoke or stirrup so that it engages over the plate edge and simultaneously contacts both sides of each contact as it moves arcuately, with a spring 8 ensuring a snug grip and good contact. A motor 20 operated by a controller 21 can pivot the movable contact either clockwise as seen in the drawing to open the interrupter or counterclockwise to close it. Respective conductors 9 and 10 are connected to the contacts 3 and 2 and lead to a circuit or piece of equipment irrelevant to the invention.

According to the invention a positive-temperature-coefficient (PCT) resistor 11 is connected between the contacts 2 and 5, another such PCT resistor 12 is connected between the contacts 5 and 6, and a standard flat-coefficient resistor 13 is connected between the contacts 6 and 7. The first PCT resistor 11 responds only to large currents by immediately heating and increasing its resistance to limit current flow through it. The second PCT resistor 12 has a lower response level and serves to limit medium-level currents to a modest residual level.

In addition the angular width of the outer contact end of the wiper contact 4 is greater than the angular spacing between adjacent fixed contacts 2, 5, 6, and 7. Thus as the contact 4 sweeps from clockwise from left to right from the FIG. 1 position to the FIG. 2 position it will first bridge the contact 2 and 5, completely shorting out the resistor 11 before it moves off the contact 2 and only onto the contact 5. At this time the full current flow will, therefore, be diverted through the first resistor 11 which, if it is a high-current flow, will clamp it in the manner well known for PCT resistors.

Subsequently the contact 4 will slide from the second contact 5 to the third contact 6, momentarily bridging them, and will land on the contact 6 so that the full current flow will be through the medium-level PCT resistor 12 also. Presuming the current is at a medium level that is too low to activate the clamping action of the first resistor 11, it will be sufficient to activate the second resistor 12 which will reduce overall current flow.

The wiper arm 4 will move to the fourth contact 7, thereby inserting the fixed flat-response resistor 13 into the circuit. The resistance of this element 13 is such that even at fairly low current levels that are too low to activate the resistors 11 and 12 it will reduce current flow slightly.

Figure 4:
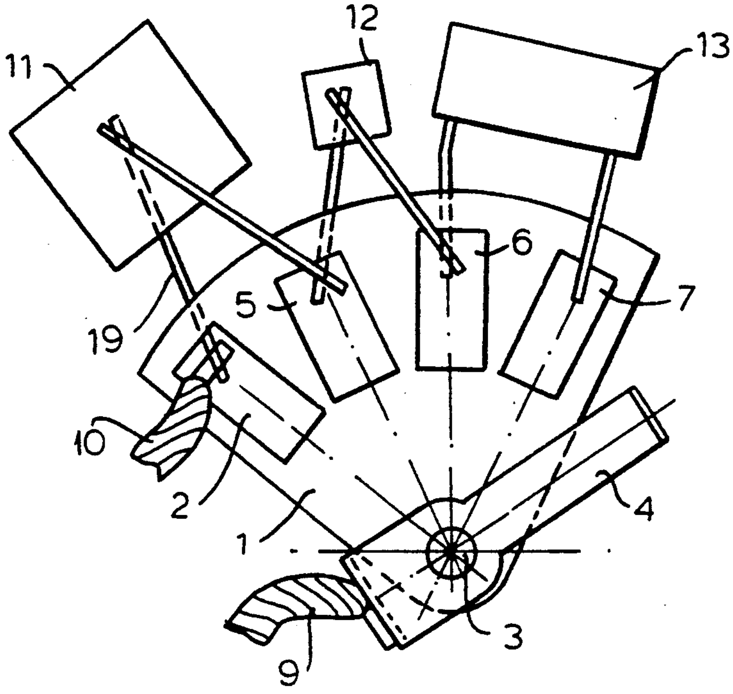
FIGS. 4 and 5 are views like FIG. 1 but respectively in the fully open and partially closed positions.

Finally the wiper arm will move into the FIG. 4 position to completely open the circuit. When thus open the resistors 11, 12, and 13 are completely out of the current-flow path.

Figure 5:
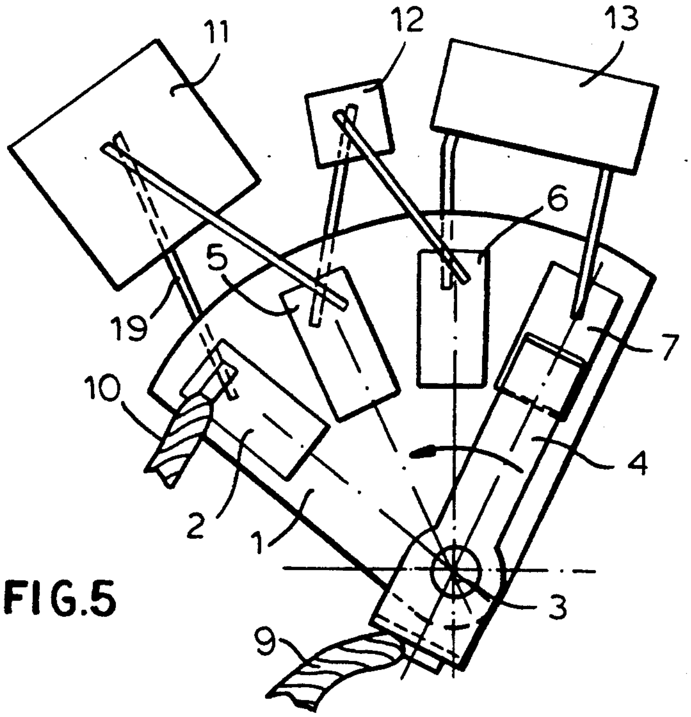
Figure 6:
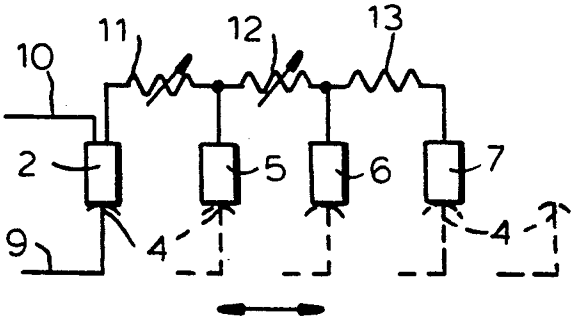
FIG. 6 is a schematic diagram for the system of FIGS. 1 through 5.

As the circuit is being restored by counterclockwise rotation of the shaft 3 as shown in FIG. 5 the current will, to start with, have to flow through all three resistors 11, 12, and 13. If the amperage is at a high or medium level the respective resistors 11 or 12 will respond to limit it, and as the contact 4 moves back successively over contacts 6, 5, and 2 it will successively let current flow increase until it lands on the first contact 2 and there will be no effective resistance to current flow through the device. In this position, which corresponds to FIG. 1, the resistors 11, 12, and 13 are completely open-circuited so that they are not subject to any significant stress, and so that they create no losses whatsoever in the circuit.

The resistances are such that the potential between adjacent fixed contacts never exceeds 20 volts. Thus arcing is completely impossible.

Figure 1:
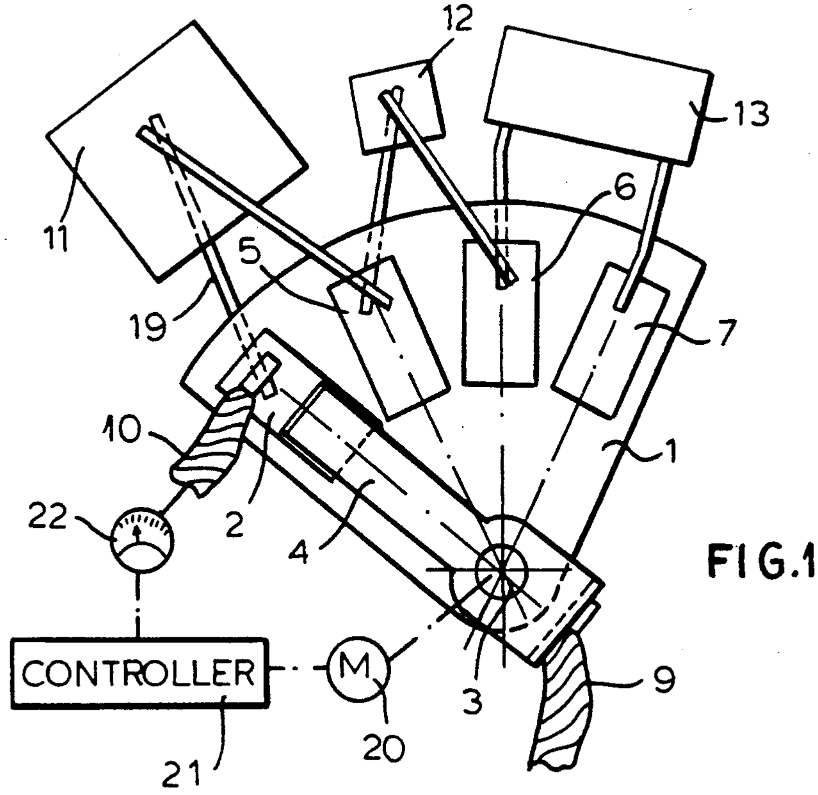
FIG. 1 is a large-scale top view of an interrupter according to this invention in the fully closed position.

In addition as indicated in FIG. 1 a current sensor 22 is provided that is connected to one of the conductors 10 for measuring current flow through the inventive interrupter. When detected current flow exceeds a predetermined maximum level or threshold, it feeds a signal to the controller 21 to reverse the motor 20 and rotate the arm 4 clockwise to open up the interrupter. This avoids burnout of the circuit elements.

Figure 7:
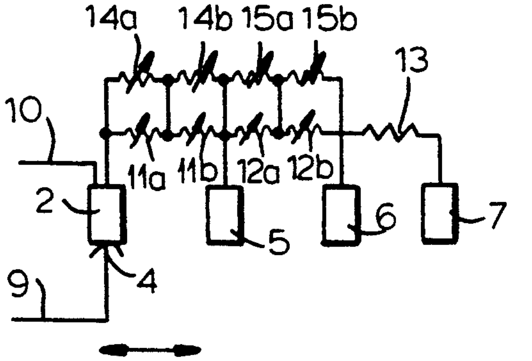
FIGS. 7 and 8 are schematic diagrams of alternative systems according to the invention.

According to the system of FIG. 7 each PCT resistor 11 and 12 is replaced by two series-connected PCT resistors 11*a*, 11*b* and 12*a*, 12*c*. In addition each such resistor 11*a*, 11*b*, 12*a*, and 12*b* is bridged by a respective varistor 14*a*, 14*b*, 15*a*, and 15*b*. This provides a high degree of overvoltage protection which could not be obtained by the use of single PCT resistors alone.

Figure 8:
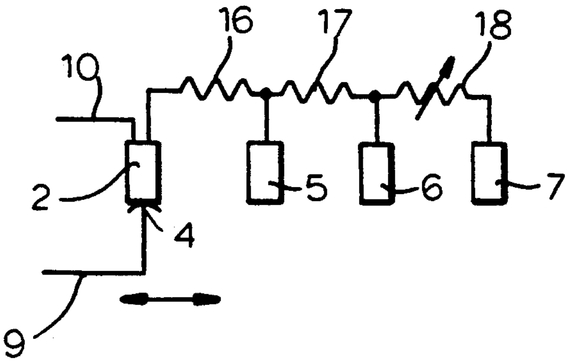

Since it is mainly during the closing operation that the resistor 13 has a purpose, namely to protect the resistors 11 and 12 in series with it from being overloaded. It is also possible as show in FIG. 8 to replace the two PCT resistors 11 and 12 with standard flat-response resistors 16 and 17 and to replace the flat-response resistor 13 with a PCT resistor 18. This provides a high degree of protection for the resistor 18 whose main function is to control high amperages.

Figure 9:
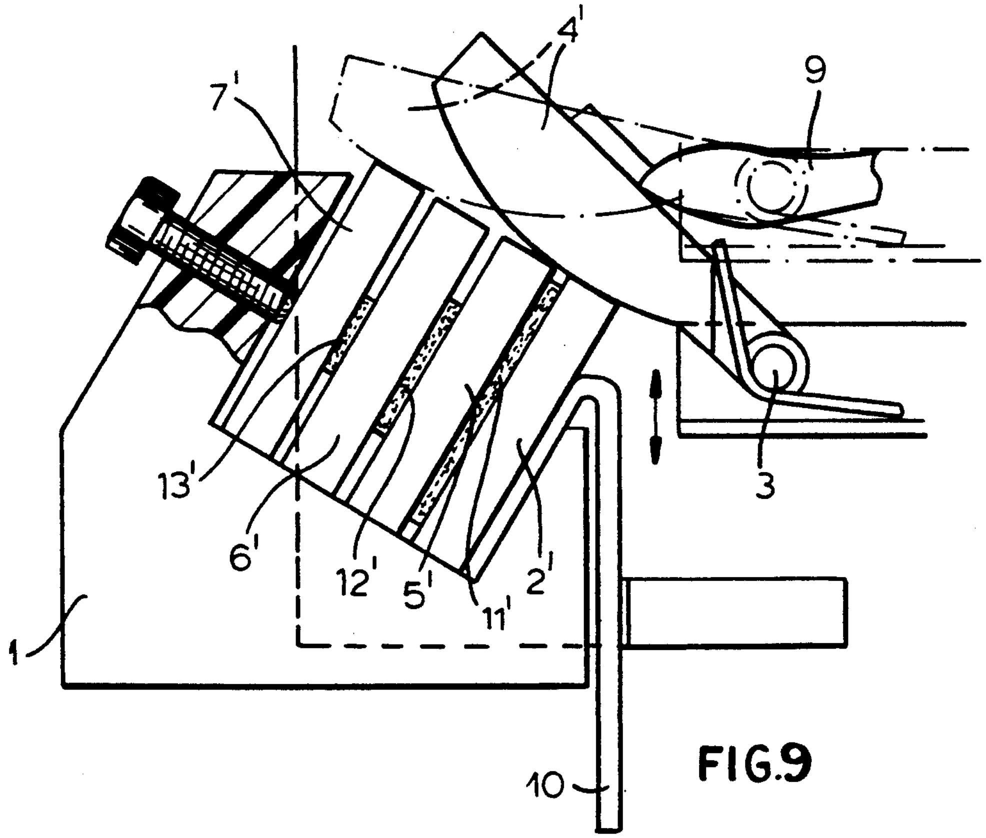
FIG. 9 is a section through another interrupter in accordance with this invention.

While in FIGS. 1 through 6 the resistors 11 and 12 are secured by contacts 19 to the respective contacts, in FIG. 9 contacts 1′, 5′, 6′, and 7′ are used which are constituted as plates sandwiching polymer or ceramic resistors 11′, 12′, and 13. A contact 4′ is employed which rocks to successively engage and disengage the contacts. This system functions identically to that of FIGS. 1 through 6.

Of course it would be possible to provide more or less contacts and PCT resistors. In this case as above the response thresholds would increase so that each resistor would be responsible for a particular current range. Similarly using such PCT resistors in series or parallel with varistors can further increase the current and voltage rating of the unit.

The contact 4 need not move angularly but can be stepped or slide linearly. Furthermore the device could be built into a circuit breaker, surge suppressor, relay, or other piece of electrical-control equipment.

I claim:

1. An electrical circuit interrupter for connection between two conductors, the interrupter comprising:
- a first fixed contact electrically directly connected to one of the conductors;
- a second fixed contact adjacent the first fixed contact;
- a movable contact electrically directly connected to the other of the conductors and displaceable between
  - a first closed position engaging only the first fixed contact,
  - a second position engaging only the second contact, and
  - an open position engaging neither of the fixed contacts; and
- a positive-temperature-coefficient resistor connected between the first and second fixed contacts, whereby
  - in the first position current can flow between the conductors without passing through the resistor,
  - in the second position current flows through the resistor and current flow is limited thereby, and
  - in the open position current does not flow between the conductors.

2. The electrical circuit interrupter defined in claim 1, further comprising:
- a third fixed contact adjacent the second fixed contact;
- a second positive-temperature-coefficient resistor separate from the first-mentioned resistor and connected between the second and third contacts, the movable contact being movable into
  - a third position engaging only the third fixed contact,
  - whereby
  - in the third position current flows through both resistors and current flow is limited thereby.

3. The electrical circuit interrupter defined in claim 2 wherein the second resistor has a higher resistance than the first resistor.

4. The electrical circuit interrupter defined in claim 3, further comprising:
- a fourth fixed contact adjacent the third fixed contact;
- a flat-coefficient resistor connected between the third and fourth contacts, the movable contact being movable into a fourth position engaging only the fourth fixed contact,
  - whereby
  - in the fourth position current flows all the resistors and current flow is limited thereby.

5. The electrical circuit interrupter defined in claim 1, further comprising:
- a third fixed contact adjacent the second fixed contact;
- a flat-coefficient resistor connected between the second and third contacts, the movable contact being movable into
  - a third position engaging only the third fixed contact,
  - whereby
  - in the third position current flows through both resistors and current flow is limited thereby.

6. The electrical circuit interrupter defined in claim 1 wherein the third contact lies between the first and second contacts, whereby on opening the contact moves into the third position before moving into the second position.

7. The electrical circuit interrupter defined in claim 1, further comprising
- a varistor in parallel with the resistor.

8. The electrical circuit interrupter defined in claim 1 wherein the resistor is formed by two positive-temperature-coefficient resistors connected in circuit.

9. The electrical circuit interrupter defined in claim 1 wherein the movable contact is also displaceable through an intermediate position simultaneously engaging both fixed contacts.

10. The electrical circuit interrupter defined in claim 1, further comprising
- control means including a sensor for detecting current flow through the interrupter for moving the movable contact into the open position when current flow through the interrupter exceeds a predetermined threshold.

11. An electrical circuit interrupter for connection between two conductors, the interrupter comprising:
- a positive-temperature-coefficient resistor having a pair of sides; and
- switch means connected between the conductors and to the resistor and movable between
  - a closed position connecting the conductors directly together with the resistor wholly out of circuit between the conductors for direct current flow between the conductors,
  - an intermediate position connecting one conductor to one of the sides of the resistor and the other of the conductors to the other side of the resistor for current flow between the conductors through the resistor, whereby when the current flow exceeds a trigger level for the resistor same limits the flow, and
  - an open position wholly disconnecting the conductors from each other and wholly disconnecting at least one side of the resistor from the conductors for open-circuiting the conductors.

* * * * *